No. 826,520. PATENTED JULY 17, 1906.
E. O. MYERS.
MOISTENER.
APPLICATION FILED OCT. 23, 1905.
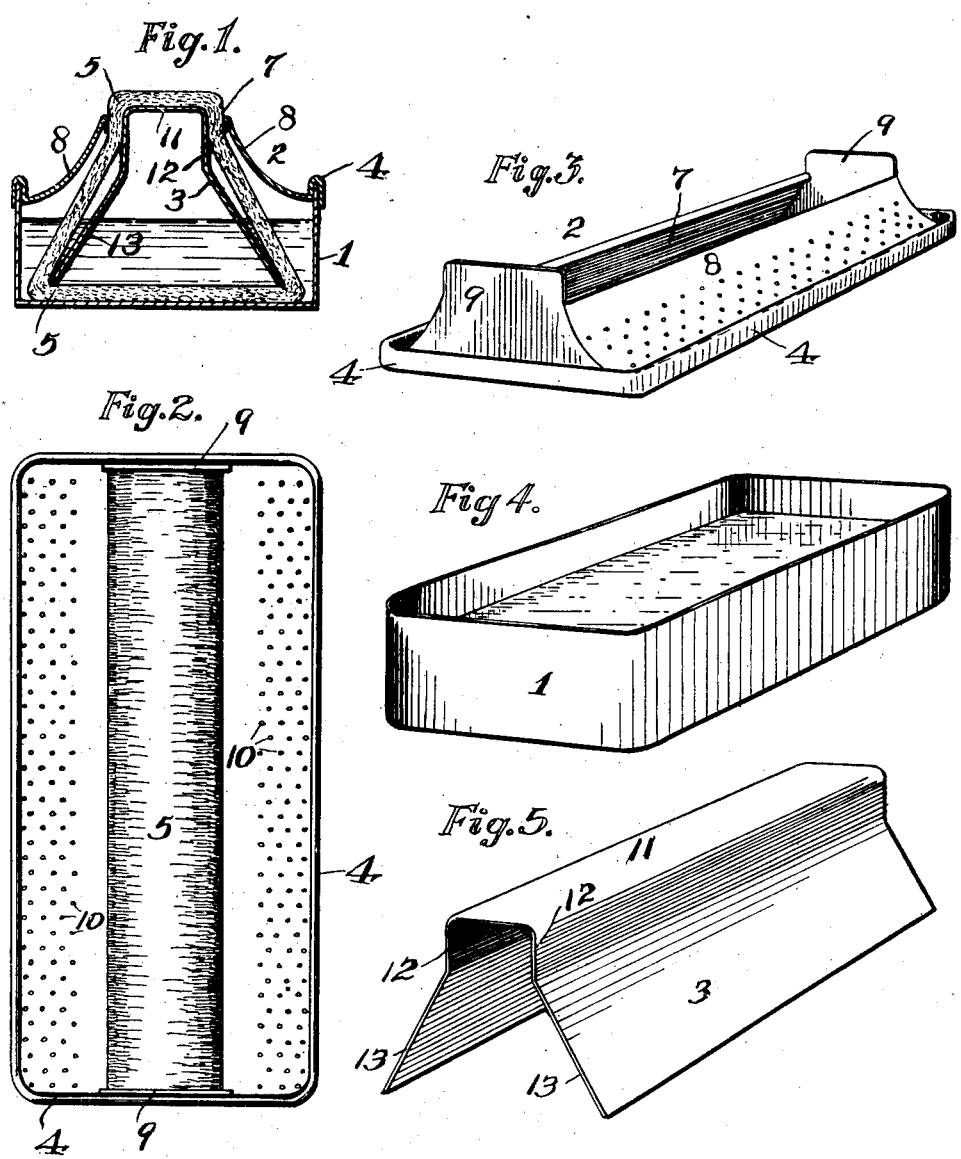
WITNESSES:
Roy Claflin
F. J. Vehmeyer
INVENTOR:
Eugene O. Myers.
BY
Edson Bros,
ATTORNEYS

UNITED STATES PATENT OFFICE.

EUGENE O. MYERS, OF ZION CITY, ILLINOIS.

MOISTENER.

No. 826,520.  Specification of Letters Patent.  Patented July 17, 1906.

Application filed October 23, 1905. Serial No. 284,065.

*To all whom it may concern:*

Be it known that I, EUGENE O. MYERS, a citizen of the United States, residing at Zion City, in the county of Lake and State of Illinois, have invented certain new and useful Improvements in Moisteners; and I do hereby declare the following to be a full, clear, and exact description of the invention, such as will enable others skilled in the art to which it appertains to make and use the same.

My invention relates to an improvement in devices for moistening postage-stamps, flaps of envelops, and the fingers for handling bills, &c.

It has for its object to provide a simple and cheap device of such size, proportions, and constructions that it will be especially adapted to all the uses of a moistener, including those enumerated above.

The invention consists of the features of construction and combinations of parts hereinafter described, and more particularly pointed out in the claims concluding this specification.

In the accompanying drawings, illustrating the preferred embodiment of my invention, Figure 1 is a vertical cross-sectional view constructed in accordance with my invention. Fig. 2 is a top plan view of the moistener. Fig. 3 is a detail perspective view of the cover. Fig. 4 is a detail perspective view of the pan or tray, and Fig. 5 is a detail perspective view of the support for the wick.

While the preferred embodiment of my invention is illustrated in the accompanying drawings and its construction and operation are described in this specification, the right is reserved to make such changes from the construction shown and described herein as the scope of the claims hereto appended will permit.

Referring more particularly to the drawings, in carrying out my invention I form the three metal parts of the moistener—namely, the pan 1, the cover 2, and the wick-support 3—by pressing them out of aluminium by means of dies. The pan is preferably rectangular in shape, as is also the cover, which is also cup-shaped and which has an outer upwardly-extending flanged portion 4 to fit over the upper edge of said pan. Said cover is curved from said flange at the sides upwardly and inwardly to the wick 5, which is mounted around the support 3 and projects through the slot 7 between said curved portions 8 of the cover. The ends 9 of the cover extend straight upward from the flange or rim 4 to a level with the top surface of the wick, thereby holding said wick in place and preventing lateral movement thereof. The curved portions of said cover are perforated, as at 10, to permit the pan to be filled without removing the cover, as well as to take up any overflow-water.

The top 11 of the wick-support is flat, and its sides extend downward a short distance parallel to each other, as at 12, and then are bent outward, as at 13. When the wick is placed on the support, the flared lower portions of said support draw said wick taut and prevent it from becoming rucked up, as when said wick is loose. The portion of the wick above the top of the support extends above the curved sides of the cover about the width of a postage-stamp and the length of the ordinary envelop, so that the envelop may be readily drawn across it at one stroke. The sides of the wick are sufficiently exposed to permit all the fingers to be moistened at once for handling bills, &c., by slightly grasping it between the thumb and fingers.

It will be noted that my invention is very simple of construction and cheap of manufacture and that the endless wick of absorbent material may be readily revolved to a new position if at any time it becomes worn, dirty, or sticky because of coming in contact with the fingers or the mucilage on postage-stamps or envelops.

Having thus described my invention, what I claim as new, and desire to secure by Letters Patent, is—

1. In a device of the character described, the combination with a receptacle, a slotted cover for said receptacle, and an endless wick, of a support for said wick having a bearing portion extending through the slot in the cover, and flared side portions extending to near the bottom of said pan, said wick fitting close to the support and drawn taut between the lower edges thereof.

2. In a device of the character described, the combination, with a pan, of a slotted cup-shaped cover having perforated portions extending outward and downward from the slot, a support extending from within the pan through the slot in the cover, and a wick mounted on said support and also extending through said slot.

3. In a device of the character described, the combination with a pan, of a slotted cover having an upwardly-extending grooved flange around its edge, to fit over the edge of said pan, and upwardly-curved perforated portions extending from the base of said flange to the slot, and a wick extending through said slot.

In testimony whereof I affix my signature in presence of two witnesses.

EUGENE O. MYERS.

Witnesses:
ROY C. CLAFLIN,
R. MAX KAETZ.